United States Patent Office 3,312,742
Patented Apr. 4, 1967

3,312,742
PROCESS FOR PRODUCING MONO-OXONATION PRODUCTS OF CYCLIC DIMERS AND TRIMERS OF BUTADIENE-(1,3)
Wolfgang Schneider and Willi Ziegenbein, Marl, Germany, assignors to Chemische Werke Huls Aktiengesellschaft, Marl, Germany
No Drawing. Filed Sept. 4, 1964, Ser. No. 394,600
Claims priority, application Germany, Oct. 17, 1963, C 31,165
7 Claims. (Cl. 260—598)

The present invention relates to a process for the production of mono-oxonation products of cyclic dimers and trimers of butadiene-(1,3). More particularly, it relates to the production of such dimers and trimers by the action of carbon monoxide and hydrogen in the presence of catalysts comprising mixtures of palladium or cobalt compounds or of finely divided palladium and specially prepared hydrogenation catalysts.

Cyclic trimers of butadiene, such as cyclododecatriene-(1,5,9), have previously been reacted with carbon monoxide and hydrogen under conditions suitable for oxosynthesis. This method produced a mixture of mono-, di-, and tri-hydroxymethyl-cyclododecanes, the principal product being the di-hydroxymethyl-cyclododecane produced in a yield of 45%. By this previously known method, however, it has not been possible to confine the reaction to the mono-stage, even by carrying out the reaction in such a manner as to reduce the yield.

It has now been discovered in accordance with the present invention that primarily mono-oxonation products can be obtained by reacting cyclic dimers and trimers of butadiene-(1,3) i.e., cyclooctadiene-(1,5), and cyclododecatriene-(1,5,9) in the presence of special mixed catalysts compirsing a cobalt or palladium compound or finely divided palladium and a hydrogenation catalyst which is stable in the presence of carbon monoxide.

Suitable cobalt catalysts for carrying out the process of the present invention are described in "Fortschritte der Chemischen Forschung," vol. 2, page 323 (1951), and include such carbonyl compounds as dicobalt octacarbonyl. Suitable palladium compounds include palladium halides such as palladium chloride, palladium bromide, and palladium deposited on charcoal.

Hydrogenation catalysts stable in the presence of carbon monoxide which are suitable for use in the process of the present invention include: copper/chromium oxide-containing catalysts such as the compounds referred to as "Adkins catalysts" in Neuere Methoden der Preparativen Organischen Chemie," vol. 1 (1944), on pages 117–123 (Verlag Chemie GmbH). Platinum and the so-called "Grundmann-Kontakt," a silver/zinc/chromium oxide catalyst are also suitable (see Table 4 and method of preparation given thereunder in "Angewandt Chemie," vol. 62, 560 (1950).

A mixed catalyst suitable for the mono-oxidation of cyclododecatriene-(1,5,9) and cyclooctadiene-(1,5) can be produced by simple mixing of cobalt or palladium catalysts and the carbon monoxide-resistant addition. Instead of dicobalt octacarbonyl, use can be made also of cobalt salts of fatty acids, and particularly of the higher fatty acids, in the presence of acid binding agents such as pyridine or quinoline. These cobalt salts under the oxonating conditions produce the effective cobalt catalyst. The catalyst is used in amounts ranging from 0.1 to 5%, and preferably from 0.2 to 2.5%, by weight of cyclododecatriene-(1,3,5) or the cyclooctadiene-(1,5). The ratio by weight of the cobalt catalyst or palladium catalysts to the carbon monoxide-resistant addition is 10:0.5 to 1:1, and preferably 5:1. The atomic ratio of copper to chromium can be 10:2 to 2:10. An especially suitable catalyst mixture consists of:

25 g. dicobalt octacarbonyl
5 g. "Adkins" catalyst produced from:
  260 g. cupric nitrate (Cu(NO$_3$)$_2$.3H$_2$O)
  151 g. ammonium bichromate
  31 g. barium nitrate
  225 ml. 28% ammonia solution The carbon monoxide:hydrogen ratio necessary for mono-oxonation ranges from 1:0.75 to 1:3, and preferably from 1:1 to 1:2. The process can be carried out at pressures ranging from 50 to 500 atms. preferably from 150 to 300 atms.

Suitable temperatures for the production of formyl-cyclododecane are from 100 to 250° C., and preferably from 130 to 140° C., and from 150 to 170° C. for the production of hydroxymethyl-cyclododecane. At about 160° C. the hydroxymethyl-cyclododecane is the principal product, being produced in yields in excess of 60%. When using cyclo-dodecatriene as the starting material, symmetrical dicyclododecyldimethyl ether is obtained as a by-product. If to the ether thus produced an equivalent amount of the previously prepared hydroxymethyl-cyclododecane is added, then a yield of more than 90% of the mono-oxidation product will be obtained from the cyclododecatriene. Similar results are obtained when cyclooctadiene-(1,5) is used as the starting material.

If desired, the process can be carried out in the presence of inert solvents, such as for example, pentane, cyclohexane, or petroleum ether.

The mono-oxonation products obtained from cyclododecatriene and cyclo-octadiene are suitable starting materials for the synthesis of synthetic plastics and adjuvants therefor, and for other organic syntheses.

The examples given below are for the purpose of illustrating the process of producing mono-oxonation products of dimers and trimers of butadiene-(1,3) and it is to be understood that various modifications and departures from the described procedures will be obvious to one skilled in the art. Any such modifications which do not depart from the concept of the present invention are intended to be included in the appended claims.

EXAMPLE 1

A 5 l. autoclave provided with heating jacket and magnetic agitator was charged with:

1500 g. cis-trans-trans-cyclododecatriene-(1,5,9)
25 g. dicobalt octacarbonyl
5 g. Adkins catalyst (produced by mixing 50.5 g. of Cu(NO$_3$)$_2$.3H$_2$O in 54 g. of water with 15.7 g. of Na$_2$Cr$_2$O$_7$ in 20 g. of water, and 20 g. of 25% ammonia solution, filtering with suction, washing, and drying at 320 to 330° C.).

After flushing the apparatus with nitrogen gas, carbon monoxide and hydrogen were introduced at 100 atms. pressure. The autoclave was then heated to 160° C. for 4 hours. During this time the pressure in the autoclave was maintained at 200 atms. by further additions of hydrogen. After cooling to 50–60° C. the autoclave was opened, the liquid reaction product removed and distilled under vacuum without removal of the catalyst. The following fractions were obtained:

(1) A small preliminary fraction consisting essentially of cyclododecane
(2) 1135 g. of hydroxymethyl-cyclododecane (61.9% of the theoretical), B.P. 0.5 105–107° C.; M.P. 32–33° C.; $n_D^{40}$=1.4884
(3) 517 g. of symmetrical dicyclododecyldimethyl ether (29.4% of the theoretical); B.P. 0.05 175–178° C., $n_D^{40}=1.5001$.

The 517 g. of dicyclododecyldimethyl ether correspond to 542 g. of the primarily produced hydroxymethylcyclododecane, so that by the oxidation a total of 1677 g. of hydroxymethyl-cyclododecane were produced, amounting to 91.5% of theoretical.

EXAMPLE 2

In an operation carried out as described in Example 1, 1500 g. of cis-trans-trans-cyclododecatriene, 25 g. of dicobalt octacarbonyl and 5 g. of Adkins catalyst (produced as described in Example 1) were reacted for four hours at 130° C. and under a total pressure of 200 atms. with carbon monoxide and hydrogen (in the proportion of 1:1 and with the reacted hydrogen being replaced under pressure). The reaction product was then distilled under vacuum and produced the following fractions:

(1) 411 g. of formylcyclo-dodecane (22.7% of the theoretical) B.P. 0.5 94–96° C., $n_D^{20}=1.4820$ (2) 664 g. of hydroxymethyl-cyclododecane (36.2% of the theoretical)

(3) 345 g. symmetrical didodecyl-dimethylether (19.7% of the theoretical).

The total amounts to 78% of the theoretical monooxidation products.

EXAMPLE 3

In this experiment the following materials were introduced into a 5 liter autoclave and the operation carried out as described in Example 1:

1500 g. cis-trans-trans-cyclododecatriene
25 g. dicobalt octacarbonyl
5 g. Grundmann Kontakt (prepared as described in Angew. Chem. 62, 560 (1950).

After completion of the reaction the reaction product was vacuum distilled and the following fractions obtained:

(1) 99 g. of cyclododecen (6.5% of the theoretical)
(2) 1287 g. (70.8% of the theoretical) of a mixture of 70% hydroxymethyl-cyclododecane and 30% of formyl-cyclododecane $n_D^{40}=1.4870$
(3) 180 g. of symmetrical dicyclododecyldimethyl ether (10.3% of the theoretical).

EXAMPLE 4

The following materials were placed in a 5 liter autoclave and the reaction carried out as described in Example 1:

1500 g. cis-trans-trans-cyclododecatriene
35.5 g. cobalt acetate tetrahydrate
23.2 g. pyridine
5 g. Adkins catalyst prepared as in Example 1.

Vacuum distillation of the reaction product gave the following fractions:

267 g. of formyl-cyclododecane (14.7% of the theoretical)

1163 g. of hydroxymethyl-cyclododecane (63% of the theoretical).

There was also obtained a higher boiling fraction of unsaturated carboxyl and formyl compounds.

EXAMPLE 5

The following materials were reacted as described in Example 1:

1500 g. cyclooctadiene-(1,5)
25 g. dicobalt octacarbonyl
5 g. Adkins catalyst prepared as described in Example 1.

After completion of the reaction, the catalyst was separated by filtration with suction and the filtrate distilled under vacuum with the following results:

(1) 270 g. of cis-cyclooctene (17.7% of the theoretical) B.P. 0.5 46–49° C., $n_D^{20}=1.4680$
(2) 1102 g. of formyl-cyclooctane (56.7% of the theoretical B.P. 0.5 71–73° C., $n_D^{20}=1.4732$
(3) 328 g. of residue containing about 30% of hydroxymethyl-cyclooctane and 20% of symmetrical dicyclooctyldimethyl ether.

What is claimed is:

1. Process for the production of mono-oxonation products of cyclic dimers and trimers of butadiene-(1,3) which comprises: subjecting at least one of said dimers and trimers to treatment with a mixture of carbon monoxide and hydrogen in a ratio of between 1:0.75 and 1:3 at elevated temperatures and pressures in the presence of a mixed catalyst comprising
   (a) a catalyst selected from the group consisting of cobalt carbonyls, cobalt salts of fatty acids with an acid binding agent, palladium halides, and finely divided palladium, and
   (b) a carbon monoxide-resistant hydrogenation catalyst selected from the group consisting of copper/chromium oxide catalysts, platinum, and silver/zinc/chromium oxide catalysts,
   wherein the ratio of (a) and (b) is between 10:0.5 and 1:1.
2. The process of claim 1 where in the ratio of (a) to (b) is about 5:1.
3. The process of claim 1 wherein the carbon monoxide/hydrogen ratio is 1:1 to 1:2.
4. The process of claim 1 wherein said treatment is conducted at 50 to 500 atmospheres.
5. The process of claim 1 wherein said treatment is conducted at 150 to 300 atmospheres.
6. The process of claim 1 wherein the treatment is conducted at 100–250° C.
7. The process of claim 1, wherein the treatment is conducted at 130–180° C.

References Cited by the Examiner

UNITED STATES PATENTS 3,184,432   5/1965   Wilke et al. _____ 260—598 X

LEON ZITVER, *Primary Examiner.*

R. H. LILES, *Assistant Examiner.*